(12) United States Patent
Nasu et al.

(10) Patent No.: US 9,792,688 B2
(45) Date of Patent: Oct. 17, 2017

(54) POSITION DETECTION DEVICE

(71) Applicants: Mitsubishi Electric Corporation, Chiyoda-ku (JP); Mitsubishi Electric Research Laboratories, Inc., Cambridge, MA (US)

(72) Inventors: Osamu Nasu, Chiyoda-ku (JP); Haruhiko Takeyama, Chiyoda-ku (JP); Toru Sasaki, Chiyoda-ku (JP); Takuya Noguchi, Chiyoda-ku (JP); Hajime Nakajima, Chiyoda-ku (JP); Yoshinao Tatei, Chiyoda-ku (JP); Shigenori Takeda, Chiyoda-ku (JP); Takeshi Musha, Chiyoda-ku (JP); Amit Agrawal, Cambridge, MA (US); Jay E. Thornton, Cambridge, MA (US)

(73) Assignees: Mitsubishi Electric Corporation, Chiyoda-ku (JP); Mitsubishi Electric Research Laboratories, Inc., Cambridge, MA (US)

( * ) Notice: Subject to any disclaimer, the term of this patent is extended or adjusted under 35 U.S.C. 154(b) by 200 days.

(21) Appl. No.: 14/873,672

(22) Filed: Oct. 2, 2015

(65) Prior Publication Data

US 2017/0098306 A1    Apr. 6, 2017

(51) Int. Cl.
  *G06K 9/62* (2006.01)
  *G06T 7/00* (2017.01)
  (Continued)

(52) U.S. Cl.
  CPC .............. *G06T 7/0042* (2013.01); *G06K 9/03* (2013.01); *G06K 9/2036* (2013.01);
  (Continued)

(58) Field of Classification Search
  CPC .......... G06K 9/03; G06K 9/6215; G06K 7/14; G06K 7/1452; G06K 7/1473;
  (Continued)

(56) References Cited

U.S. PATENT DOCUMENTS 5,170,396 A * 12/1992 Rivers ................ G11B 20/1419
                                                      375/333
6,664,535 B1 * 12/2003 Nahum .............. G01D 5/34792
                                                      250/231.14

(Continued)

FOREIGN PATENT DOCUMENTS

EP      1 983 308 B1    10/2008
JP      5103267         12/2012
JP      5553669         7/2014

*Primary Examiner* — Andrew Moyer
*Assistant Examiner* — Narek Zohrabyan
(74) *Attorney, Agent, or Firm* — Oblon, McClelland, Maier & Neustadt, L.L.P.

(57) ABSTRACT

To obtain a position detection device capable of detecting highly accurate and robust position by suppressing affect of error detection of an edge, provided is a configuration for performing a validity determination of edges detected by binarizing an image signal (21) converted by a light-receiving element (3) for receiving light irradiated from a light source (1) toward a scale (2) having a code pattern, and performing position detection after removing the edges determined to be invalid as edges that have been affected by foreign matter and the like among the edges on which the validity determination has been performed.

17 Claims, 10 Drawing Sheets

(51) Int. Cl.
 G06K 9/03    (2006.01)
 G06K 9/20    (2006.01)
 G06K 9/46    (2006.01)
 G06T 7/73    (2017.01)
 G06T 7/13    (2017.01)

(52) U.S. Cl.
 CPC ......... G06K 9/4604 (2013.01); G06K 9/6215 (2013.01); G06T 7/0085 (2013.01); G06T 7/13 (2017.01); G06T 7/73 (2017.01)

(58) Field of Classification Search
 CPC .... G06K 7/1486; G06K 7/10831; G06T 7/73; G01D 5/2454; G01D 5/2451; G01D 5/347; G01D 5/34707; G01D 5/34715; G01D 5/2457
 USPC ....... 382/199, 164, 165, 173, 172, 171, 190, 382/195; 33/707, 1 PT, 706; 250/231.14, 250/566, 231.18; 356/617, 618, 614; 341/13
 See application file for complete search history.

(56) References Cited

U.S. PATENT DOCUMENTS

| | | | |
|---|---|---|---|
| 7,770,304 B2 | 8/2010 | Oberhauser et al. | |
| 2004/0089796 A1* | 5/2004 | Patzwald | G01D 5/2455 250/231.1 |
| 2009/0272886 A1* | 11/2009 | Kusano | G01D 5/2454 250/231.1 |
| 2009/0283667 A1* | 11/2009 | Morimoto | G01D 5/24409 250/231.13 |
| 2012/0283986 A1* | 11/2012 | Veeraraghavan | G01D 5/2455 702/150 |
| 2015/0153205 A1* | 6/2015 | Uozumi | G01D 5/24476 318/640 |
| 2015/0300847 A1* | 10/2015 | Ishizuka | G01D 5/34776 250/231.1 |

* cited by examiner

POSITION DETECTION DEVICE

BACKGROUND OF THE INVENTION

1. Field of the Invention

The present invention relates to a position detection device for detecting an absolute position based on an image signal converted by a light-receiving element for receiving light irradiated from a light source toward a scale having a code pattern.

2. Description of the Related Art

In a positioning device such as a measurement device or a servomotor, accurate position detection is essential in order to realize high-level control. An encoder is an example of a device that is widely used to perform this kind of position detection. The encoder needs to be capable of highly accurate position detection as well as have a robustness having a high resistance to foreign matter and noise.

When high accuracy and a high level of robustness are required for position detection, an optical encoder is used. The optical encoder is usually configured from a light source, a scale having an equally spaced pattern or a pseudo-random code, and one or a plurality of light-receiving elements.

The optical encoder can be used for position detection by calculating a correlation between a signal waveform obtained from the light-receiving element and a known pattern marked on the scale.

Further, there has also been proposed a method (e.g., see Japanese Patent No. 5103267) that, by not only focusing on the signal waveform obtained from the light-receiving element but also on the edges detected based on a threshold, enables position detection at a resolution equal to or smaller than the code pattern by calculating a correlation between a binarized code pattern and a known pattern marked on the scale, and using a histogram of relative positions of the edges.

However, in the related art, there is a problem in that highly accurate position detection that relies on the relative positions of the edges is very susceptible to the affect of error detection of the edge positions. The error detection of the edge positions occurs due to signal disruptions caused by foreign matter that has worked itself onto the scale or the light-receiving element, or by electrical noise.

SUMMARY OF THE INVENTION

The present invention has been created in order to solve problems such as that described above. It is an object of the present invention to provide a position detection device capable of detecting highly accurate and robust position by suppressing the affect of error detection of an edge.

According to one embodiment of the present invention, there is provided a position detection device for detecting an absolute position based on an image signal converted by a light-receiving element for receiving light irradiated from a light source toward a scale having a code pattern, the position detection device including: an edge detection unit for detecting edges by binarizing the image signal converted by the light-receiving element; an edge evaluation unit for performing a validity determination based on a comparison between a bit period, which is a width corresponding to one bit of the code pattern marked on the scale, and a position of each of the edges detected by the edge detection unit; a code string generation unit for generating a code string from the edges determined as being valid based on results of the validity determination performed by the edge evaluation unit; a coarse position calculation unit for calculating a position in bit period units as coarse position data by comparing and performing a correlation calculation between the code string generated by the code string generation unit and the code pattern; a phase calculation unit for calculating, based on the results of the validity determination performed by the edge evaluation unit, a phase, which is a relative deviation of the bit period or less, as phase data based on a distance between the positions of the edges determined as being valid and a bit period position, which is a reference position in bit period units generated based on the bit period; and an absolute position calculation unit for calculating the absolute position by adding the coarse position data calculated by the coarse position calculation unit and the phase data calculated by the phase calculation unit.

According to the one embodiment of the present invention, the configuration is provided, which performs the validity determination of the edges detected by binarizing the image signal converted by the light-receiving element for receiving the light irradiated from the light source toward the scale having the code pattern, and performs the position detection after removing, among the edges on which the validity determination has been performed, the edges determined to be invalid as the edges that have been affected by foreign matter and the like. As a result, the position detection device can be obtained that is capable of highly accurate and robust position detection by suppressing the affect of the error detection of an edge.

DETAILED DESCRIPTION OF THE PREFERRED EMBODIMENTS

Now, a position detection device according to exemplary embodiments of the present invention is described referring to the accompanying drawings. Note that, in the illustration of the drawings, the same or corresponding components are denoted by the same reference symbols, and the overlapping description thereof is omitted. Further, the present invention can be specifically applied, for example, for the positioning of a servomotor and the like.

First Embodiment

Figure 1:
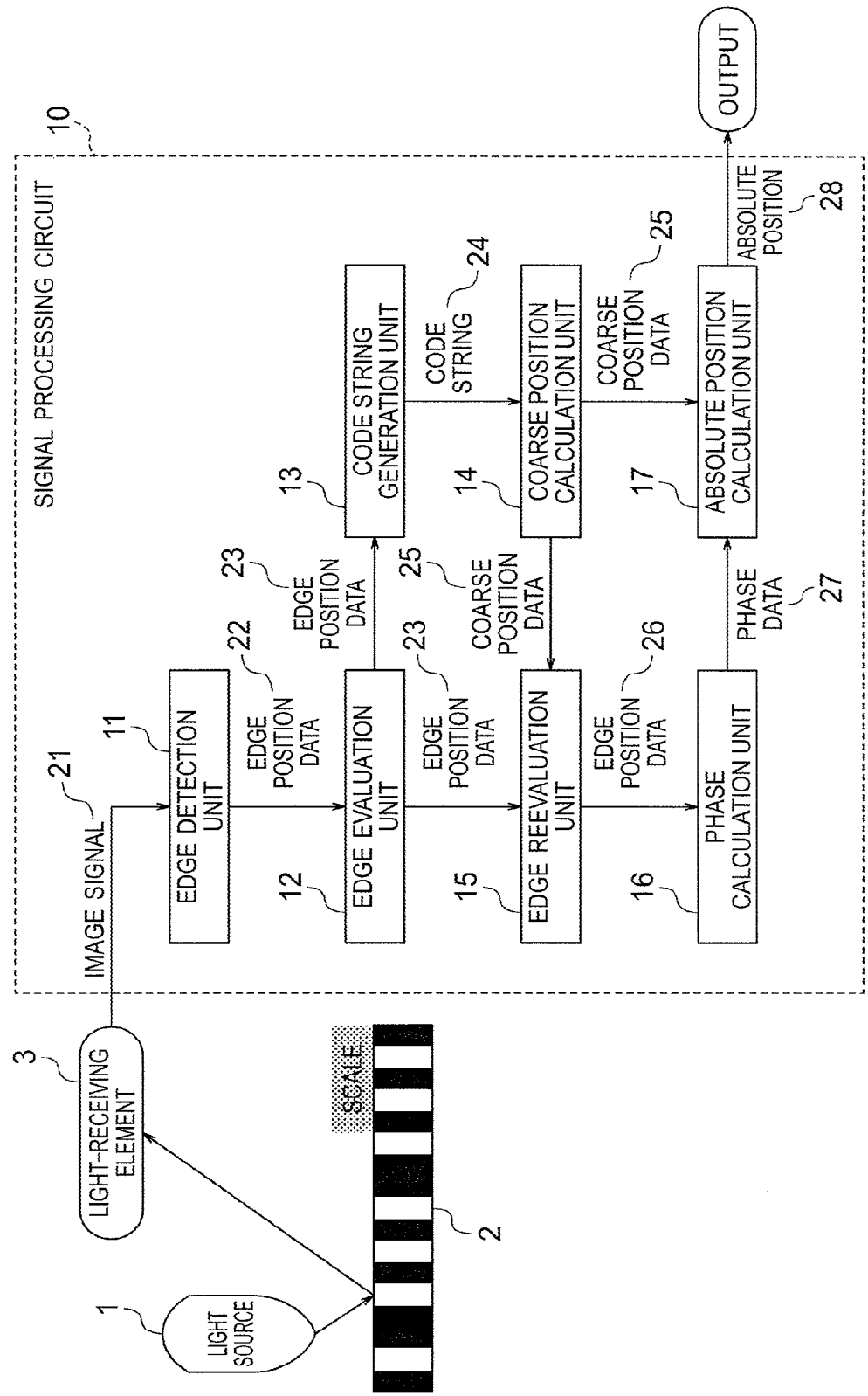
FIG. 1 is a block diagram for illustrating a configuration of a position detection device according to a first embodiment of the present invention.

FIG. 1 is a block diagram for illustrating a configuration of a position detection device according to a first embodiment of the present invention. The position detection device illustrated in FIG. 1 includes a light source 1, a scale 2, a light-receiving element 3, and a signal processing circuit 10.

The light source 1 is configured to radiate light toward the scale 2, which has a code pattern. A specific example of the light source 1 is a light-emitting diode (LED). A specific example of the code pattern marked on the scale 2 is a pseudo-randomly coded contrast pattern. Note that, the first embodiment is described based on an exemplary case in which the scale 2 has a pseudo-random code.

The light-receiving element 3 is configured to receive the light irradiated from the light source 1 toward the scale 2, and convert the received light into an image signal 21. Further, the light-receiving element 3 is configured to output the image signal 21 obtained by conversion to the signal processing circuit 10. A specific example of the light-receiving element 3 is an image sensor. Thus, the light irradiated from the light source 1 passes through the scale 2, and is converted into the image signal 21 by the light-receiving element 3. Then, the generated image signal 21 is input to the signal processing circuit 10.

The signal processing circuit 10 includes an edge detection unit 11, an edge evaluation unit 12, a code string generation unit 13, a coarse position calculation unit 14, an edge reevaluation unit 15, a phase calculation unit 16, and an absolute position calculation unit 17. The signal processing circuit 10 is realized by, for example, a central processing unit (CPU) for executing programs stored in a memory, and a processing circuit such as a system LSI.

The edge detection unit 11 is configured to process the image signal 21 input from the light-receiving element 3. Specifically, the edge detection unit 11 binarizes the image signal 21 based on a binarization processing threshold set in advance. After binarizing the image signal 21, the edge detection unit 11 outputs data including the positions of edges between the "0"s and the "1"s, and the direction of the edges determined from the previous and the next bit values to the edge evaluation unit 12 as edge position data 22.

The edge evaluation unit 12 is configured to determine the validity of each edge position included in the edge position data 22 input from the edge detection unit 11 based on a width corresponding to one bit of the pseudo-random code marked on the scale 2. Further, the edge evaluation unit 12 is configured to output the edge position data 22 including the validity determination results to the code string generation unit 13 and the edge reevaluation unit 15 as edge position data 23. Note that, the width corresponding to one bit of the pseudo-random code marked on the scale 2 is referred to as a "bit period".

The code string generation unit 13 is configured to generate, based on the positions of the edges and the directions of the edges included in the edge position data 23 input from the edge evaluation unit 12, a code string 24 made up of "0"s and "1"s, and output the generated code string 24 to the coarse position calculation unit 14.

The coarse position calculation unit 14 is configured to calculate a position in bit period units by comparing and performing a correlation calculation on the pseudo-random code marked on the scale 2 and the code string 24 input from the code string generation unit 13. Further, the coarse position calculation unit 14 is configured to output the calculated position in bit period units as coarse position data 25 to the edge reevaluation unit 15 and the absolute position calculation unit 17. Note that, the pseudo-random code marked on the scale 2 is a known scale.

The edge reevaluation unit 15 is configured to update, based on the coarse position data 25 input from the coarse position calculation unit 14, the validity determination results included in the edge position data 23 input from the edge evaluation unit 12, and output the edge position data 23 including the updated validity determination results to the phase calculation unit 16 as edge position data 26.

The phase calculation unit 16 is configured to calculate a relative deviation of a bit period or less based on a distance between each edge position included in the edge position data 26 input from the edge reevaluation unit 15 and a reference position in bit period units generated based on the bit period. Further, the phase calculation unit 16 is configured to output the calculated deviation to the absolute position calculation unit 17 as phase data 27. Note that, the reference position in bit period units generated based on the bit period is referred to as a "bit period position".

The absolute position calculation unit 17 is configured to calculate an absolute position 28 by adding the coarse position data 25 input from the coarse position calculation unit 14 and the phase data 27 input from the phase calculation unit 16, and output the calculated absolute position 28.

[Details of the Edge Detection Unit 11]

Figure 2:
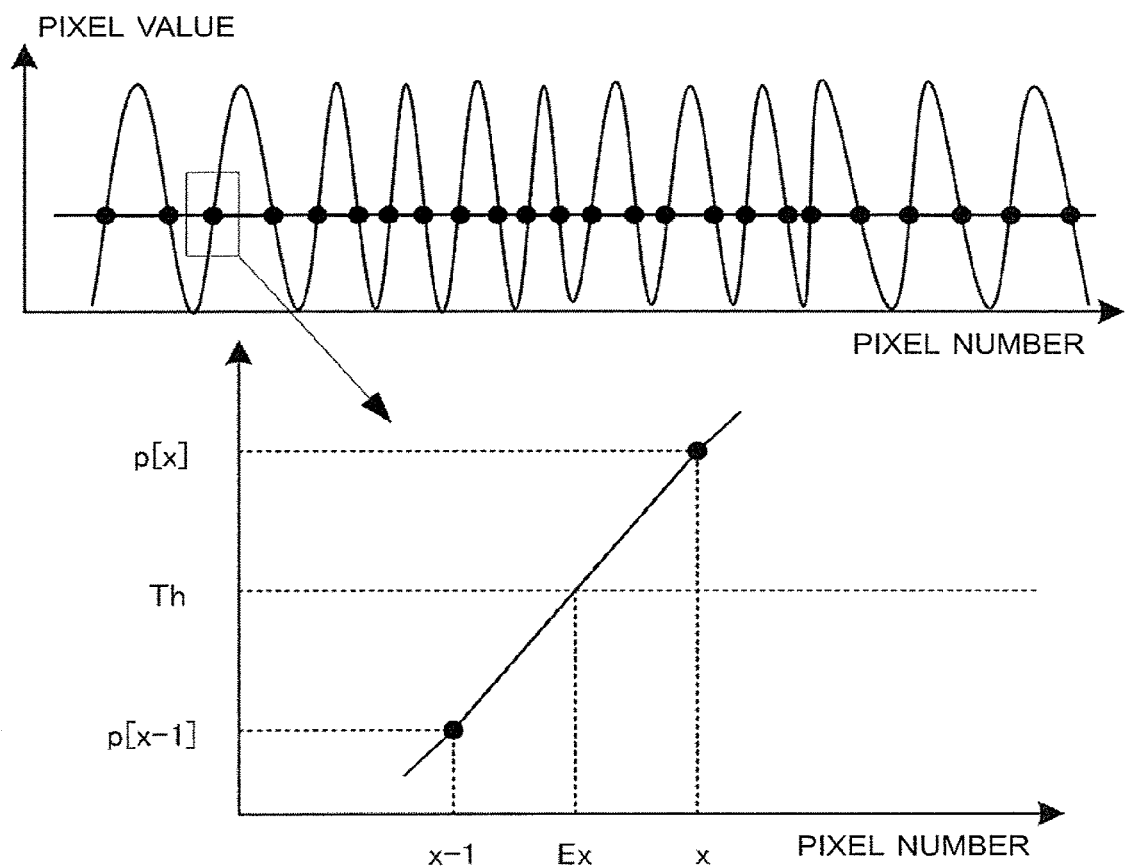
FIG. 2 is an explanatory diagram for showing an edge detection sequence by an edge detection unit according to the first embodiment of the present invention.

Next, the edge detection unit 11 is described in more detail with reference to FIG. 2. FIG. 2 is an explanatory diagram for showing an edge detection sequence by the edge detection unit 11 according to the first embodiment of the present invention.

As described above, the edge detection unit 11 is configured to binarize the image signal 21 based on a binarization processing threshold. Specifically, as shown in FIG. 2, the light-receiving element 3 receives the light irradiated from the light source 1 toward the scale 2, which has a contrast pattern. The light-receiving element 3 then converts the received light into the image signal 21. The intersections in the image signal 21 between the binarization processing threshold and the signal waveform of the image signal 21 are the positions of the edges between the binarized "0"s and "1"s. These intersections indicating the edge positions are calculated to a sub-pixel resolution based on Expression (1).

$$Ex = \frac{Th - p[x-1]}{p[x] - p[x-1]} + (x-1) \qquad (1)$$

In Expression (1), Ex represents an edge position, Th represents the binarization processing threshold, x−1 represents a pixel position immediately before the intersection between the binarization processing threshold and the signal waveform, x represents a pixel position immediately after the intersection between the binarization processing threshold and the signal waveform, p[x] represents a pixel value at a pixel position x, and p[x−1] represents a pixel value at a pixel position x−1.

Further, in the calculation of Ex based on Expression (1), when p[x−1]<p[x], the edge corresponding to the calculated Ex is defined as a "rising edge", and when p[x−1]≥p[x], the edge corresponding to the calculated Ex is defined as a "falling edge".

[Details of the Edge Evaluation Unit 12]

Figure 3:
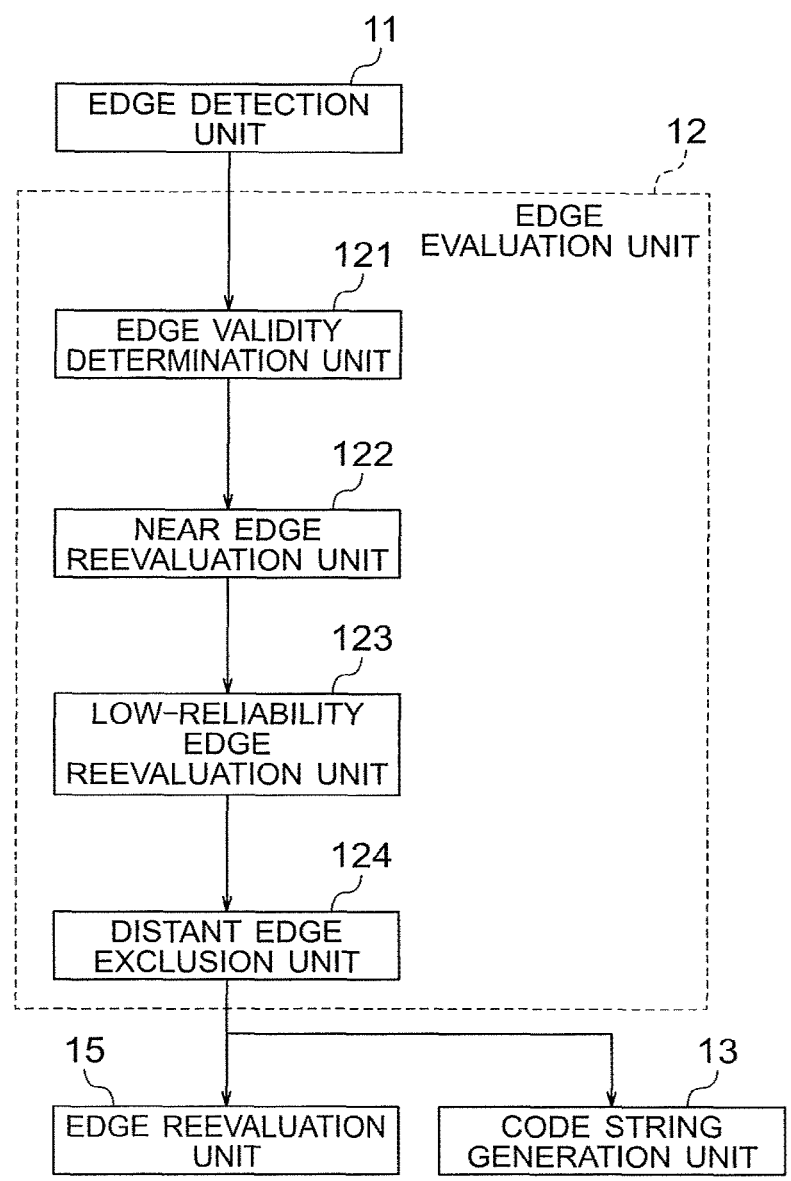
FIG. 3 is a block diagram for illustrating a configuration of an edge evaluation unit according to the first embodiment of the present invention.

Next, the edge evaluation unit 12 is described in more detail with reference to FIG. 3. FIG. 3 is a block diagram for illustrating a configuration of the edge evaluation unit 12 according to the first embodiment of the present invention.

The edge evaluation unit 12 is configured to determine a combination of validity determinations of each edge that gives the highest number of edges determined as being valid based on the bit period and a difference between arbitrary two edges of the edges detected by the edge detection unit 11. Further, as illustrated in FIG. 3, the edge evaluation unit 12 includes an edge validity determination unit 121, a near edge reevaluation unit 122, a low-reliability edge reevaluation unit 123, and a distant edge exclusion unit 124.

<Edge Validity Determination Unit 121>

The edge validity determination unit 121 is configured to determine the validity of all the edges included in the edge position data 22 by determining a relationship between two edges by comparing the distance between the two edges with a known bit period.

In order to represent the relationship between the two edges, a matrix of M rows and N columns, which includes M number of rows and N number of columns, is defined. This matrix is referred to as a "edge determination matrix". In the edge determination matrix, M, which is an integer of 1 or more to N or less, is a value set in advance, and N is the number of edges included in the edge position data 22.

Row j, column i of the edge determination matrix represents the relationship between an edge i and an edge i−j. At row j, column i in the edge determination matrix, when the interedge distance between the edge i and the edge i−j is equal to a constant factor of the bit period, or, when a difference between the interedge distance and the constant factor of the bit period is equal to or less than a difference setting value set in advance, the element is considered to be a positive integer, and when this is not the case, the element is considered to be 0. When the element at row j, column i is a positive integer, such a case is referred to as "the edge i and the edge i−j are connected".

When the element at row j, column i of the edge determination matrix is a positive integer, the value of that element is represented as the maximum number +1 of the edges determined as being valid at the edge i−j from the edge i.

Figure 4:
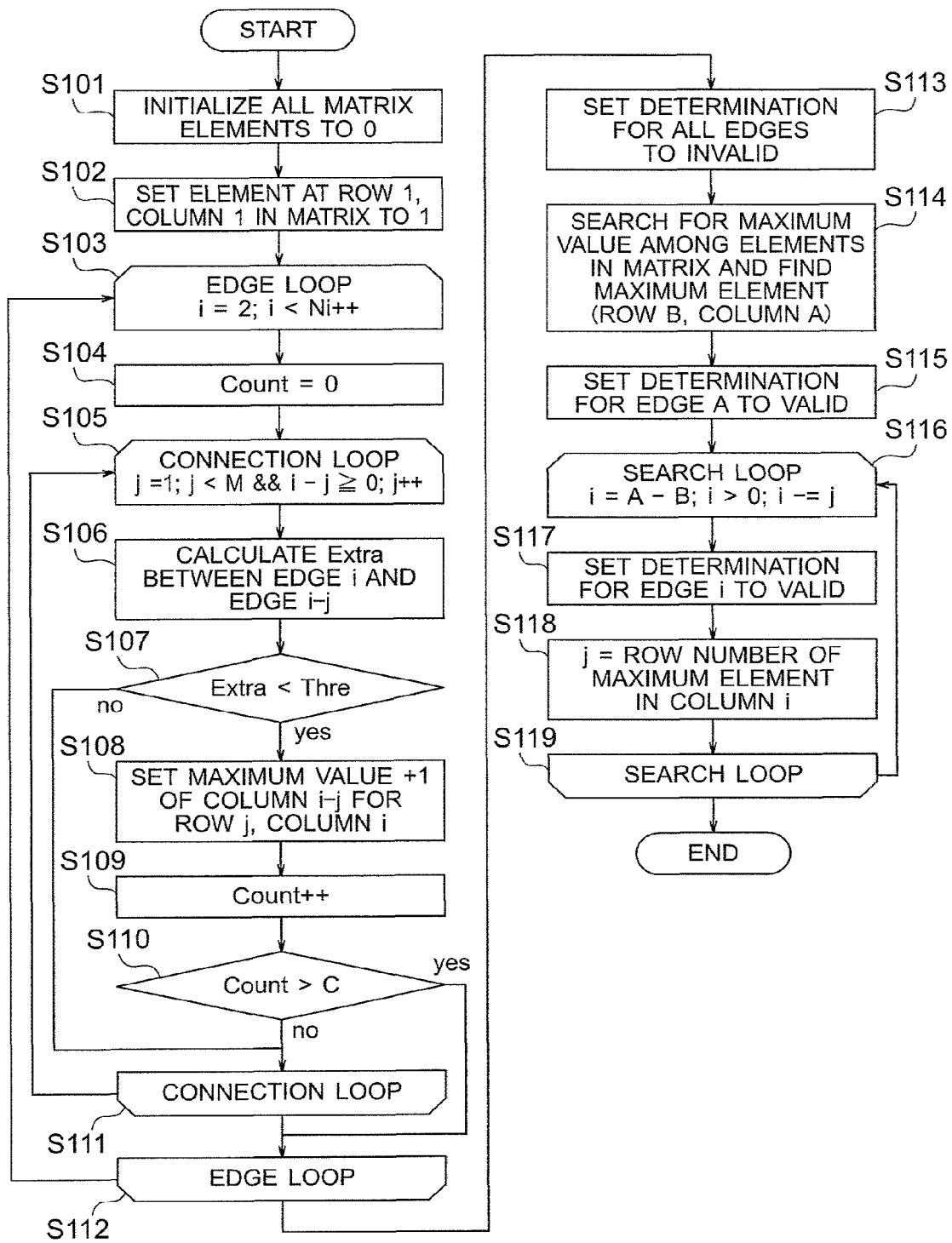
FIG. 4 is a flowchart for illustrating a series of operations by an edge validity determination unit according to the first embodiment of the present invention.

A series of operations performed by the edge validity determination unit 121 is now described with reference to FIG. 4. FIG. 4 is a flowchart for illustrating a series of operations by the edge validity determination unit 121 according to the first embodiment of the present invention. The edge validity determination unit 121 is configured to generate the edge determination matrix and perform an edge validity determination using the generated edge determination matrix by executing the processing of the flowchart illustrated in FIG. 4.

In Step S101, the edge validity determination unit 121 sets all the elements in the edge determination matrix to 0. In other words, the edge validity determination unit 121 sets all the edges included in the edge position data 22 to an initial state in which none of the edges are connected to any other edges.

In Step S102, the edge validity determination unit 121 sets the element at row 1, column 1 of an edge 1 serving as a reference to 1.

Next, for an edge 2 to an edge N, the edge validity determination unit 121 calculates each element from column 2 to column N in a loop from Step S103 to Step S112. Before determining each of the elements from column 2 to column N, in Step S104, the edge validity determination unit 121 initializes an internal variable Count to 0.

Further, in order to calculate the elements of row i, the edge validity determination unit 121 calculates each element from row 1 to row M in a loop from Step S105 to Step S111.

In Step S106, the edge validity determination unit 121 calculates a distance Extra between the edge i and the edge i−j. The distance Extra is defined by Expression (2). The edge validity determination unit 121 calculates the distance Extra based on Expression (2).

$$\text{Extra}(x,y) = \min_n |(ZC(x) - ZC(y)) - f \times n| \qquad (2)$$

In Expression (2), a distance Extra(x, y) represents a distance between an edge x and an edge y, ZC(x) represents a position of the edge x, ZC(y) represents a position of the edge y, f represents the bit period, and n denotes a non-negative integer.

Figure 5:
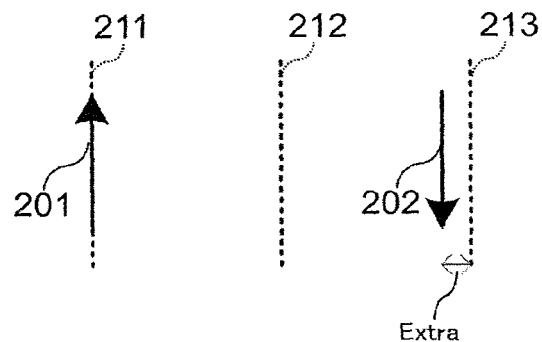
FIG. 5 is an explanatory diagram for showing a distance Extra calculated by the edge validity determination unit according to the first embodiment of the present invention.

The distance Extra calculated by the edge validity determination unit 121 is now described in more detail with reference to FIG. 5. FIG. 5 is an explanatory diagram for showing the distance Extra calculated by the edge validity determination unit 121 according to the first embodiment of the present invention.

In FIG. 5, a case is shown in which the non-negative integer n is 2. Further, in FIG. 5, an example of a positional relationship of an edge 201 and an edge 202 with bit period positions 211 to 213 is shown. The edge 201 is a rising edge, and the edge 202 is a falling edge.

As shown in FIG. 5, the edge 201 is positioned on the bit period position 211, and the edge 202 is positioned away from the bit period position 213 on the bit period position 212 side. In such a positional relationship, the distance Extra between the edge 201 and the edge 202 calculated based on Expression (2) corresponds to the distance between the edge 202 and the bit period position 213.

Returning to FIG. 4, in Step S107, the edge validity determination unit 121 compares the distance Extra calculated in Step S106 with a distance threshold Thre set in advance, and based on the comparison result, executes Step S108 or Step S111. In other words, when the distance Extra is less than the distance threshold Thre, the edge validity determination unit 121 executes the processing of Step S108, and when the distance Extra is equal to or more than the distance threshold Thre, the edge validity determination unit 121 executes the processing of Step S111.

In Step S108, the edge validity determination unit 121 calculates the maximum value from each of the values of the elements in columns i–j of the edge determination matrix, adds 1 to the maximum value, and sets the obtained value for the element at row j, column i. Then, in Step S109, the edge validity determination unit 121 adds 1 to the internal variable Count.

In Step S110, the edge validity determination unit 121 determines whether or not the internal variable Count is more than a variable setting value C set in advance, and based on the determination result, executes Step S111 or Step S112. In other words, when the internal variable Count is more than the variable setting value C, the edge validity determination unit 121 executes the processing of Step S112, and when the internal variable Count is not more than the variable setting value C, the edge validity determination unit 121 executes the processing of Step S111. Thus, when the internal variable Count is more than the variable setting value C, the processing of column i is finished.

Figure 6:
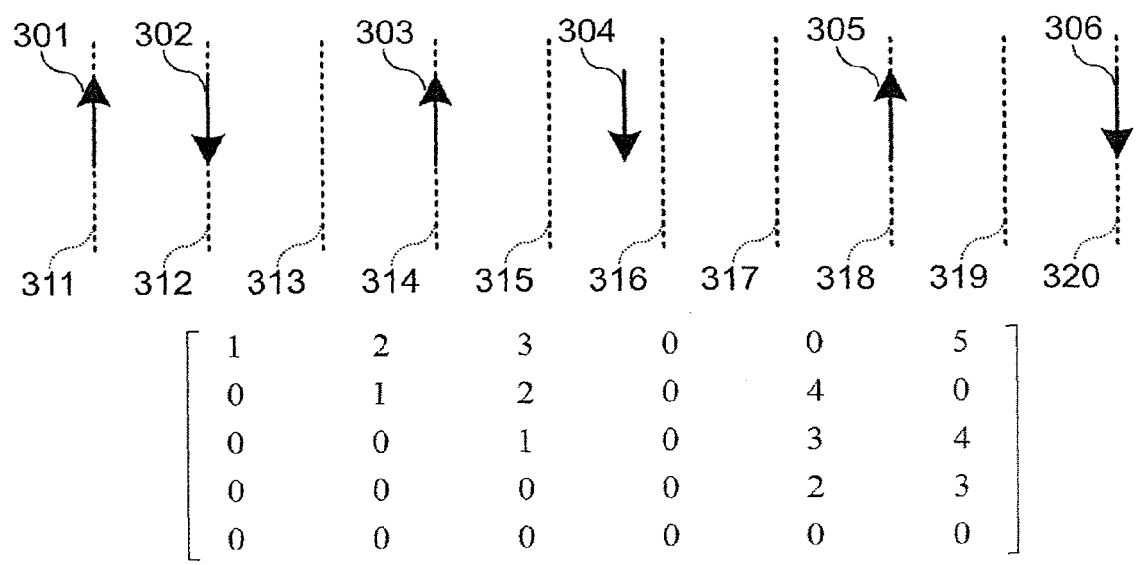
FIG. 6 is an explanatory diagram for showing an edge determination matrix generated by the edge validity determination unit according to the first embodiment of the present invention.

An example of the edge determination matrix that is ultimately generated by sequentially performing the processing from Step S101 to Step S112 as described above is now described with reference to FIG. 6. FIG. 6 is an explanatory diagram for showing the edge determination matrix generated by the edge validity determination unit 112 according to the first embodiment of the present invention.

In FIG. 6, an example is shown in which the number of columns N, which corresponds to the number of edges, is 6, the number of rows M is 5, and the variable setting value C is 3. Further, in FIG. 6, an example of a positional relationship between edges 301 to 306 and bit period positions 311 to 320 is shown. In addition, the edges 301, 303, and 305 are leading edges, and the edges 302, 304, and 306 are trailing edges.

As shown as an example in FIG. 6, the six edges 301 to 306 are all, except for the edge 304, positioned on bit period positions. In other words, the five edges excluding the edge 304 are in a state in which those edges are all connected to each other.

Specifically, for example, row 2, column 3 in the edge determination matrix represents the relationship between the edge 303, which is the third edge, and the edge 301, which is the first edge and serves as a reference. Because the edge 303 and the edge 301 are connected, the element at row 2, column 3 is a positive integer. In the edge determination matrix, the maximum value among the elements in column 1 is 1, which is the value of the element at row 1, column 1, and hence the value of the element at row 2, column 3 is 2.

Similarly, for example, row 3, column 5 in the edge determination matrix represents the relationship between the edge 305, which is the fifth edge, and the edge 302, which is the second edge. Because the edge 305 and the edge 302 are connected, the element at row 3, column 5 is a positive integer. In the edge determination matrix, the maximum value among the elements in column 2 is 2, which is the value of the element at row 1, column 2, and hence the value of the element at row 3, column 5 is 3.

Further, the edge 304, which is the fourth edge, is not connected to any other edges, and hence in the edge determination matrix, each element in column 4 is 0.

Returning to FIG. 4, the edge validity determination processing performed using the edge determination matrix after the edge determination matrix has been generated is now described in more detail.

In Step S113, the edge validity determination unit 121 sets the determination for each edge to invalid. After Step S113 has been executed, in Step S114, the edge validity determination unit 121 searches for the element having the maximum value among the elements in the edge determination matrix. The edge validity determination unit 121 sets the row number of the element having the maximum value as row B, and the column number as column A. In other words, in the edge determination matrix, the element at row B, column A has the maximum value among all the elements in the matrix.

After Step S114 has been executed, in Step S115, the edge validity determination unit 121 sets the determination of edge A to valid. After Step S115 has been executed, in Step S116, the edge validity determination unit 121 sets i to A–B. After Step S116 has been executed, in Step S117, the edge validity determination unit 121 sets the determination for edge i to valid.

After Step S117 has been executed, in Step S118, the edge validity determination unit 121 sets to j the row number in which the element having the maximum value among the elements in column i is set. After Step S118 has been executed, the edge validity determination unit 121 executes Step S119, and then, in Step S116, updates i to i–j. Subsequently, in the loop from Step S116 to Step S119, the edge validity determination unit 121 repeats the processing while i is larger than 0. As a result, the validity determination for all the edges is completed.

The flow of the edge validity determination by the edge validity determination unit 121 is now described in more detail with reference to FIG. 4 and FIG. 6.

In Step S114, the edge validity determination unit 121 searches for the element having the maximum value among the elements in the edge determination matrix. As shown in FIG. 6, the maximum value in the edge determination matrix is 5, which is for the element at row 1, column 6, and hence A=6 and B=1.

In Step S115, because A=6, the edge validity determination unit 121 sets the determination for the edge 306, which is the sixth edge, to valid. Then, in Step S116, because A–B=6–1=5, the edge validity determination unit 121 sets i to 5.

In Step S117, because i=5, the edge validity determination unit 121 sets the determination for edge 305, which is the fifth edge corresponding to an edge 5, to valid. Then, in Step S118, in the edge determination matrix, the element at row 2, column 5 has the maximum value among the elements in column 5, and hence the edge validity determination unit 121 sets 2 as the row number for j. In other words, the edge validity determination unit 121 sets j to 2.

Next, in Step S116, because i=5 and j=2, and hence i–j=5–2=3, the edge validity determination unit 121 sets i to 3.

In Step S117, because i=3, the edge validity determination unit 121 sets the determination for the edge 303, which is the third edge corresponding to an edge 3, to valid. Then, in Step S118, in the edge determination matrix, the element at row 1, column 3 has the maximum value among the elements in column 3, and hence the edge validity determination unit 121 sets 1 as the row number for j. In other words, the edge validity determination unit 121 sets j to 1.

Next, in Step S116, because i=3 and j=1, and hence i–j=3–1=2, the edge validity determination unit 121 sets i to 2.

In Step S117, because i=2, the edge validity determination unit 121 sets the determination for the edge 302, which is the second edge corresponding to the edge 2, to valid. Then, in Step S118, in the edge determination matrix, the element at row 1, column 2 has the maximum value among the elements in column 2, and hence the edge validity determination unit 121 sets 1 as the row number for j. In other words, the edge validity determination unit 121 sets j to 1.

Next, in Step S116, because i=2 and j=1, and hence i−j=2−1=1, the edge validity determination unit 121 sets i to 1.

In Step S117, because i=1, the edge validity determination unit 121 sets the determination for the edge 301, which is the first edge corresponding to the edge 1, to valid. Then, in Step S118, in the edge determination matrix, the element at row 1, column 1 has the maximum value among the elements in column 1, and hence the edge validity determination unit 121 sets 1 as the row number for j. In other words, the edge validity determination unit 121 sets j to 1.

Next, in Step S116, because i=1 and j=1, and hence i−j=1−1=0, the edge validity determination unit 121 sets i to 0. In this case, because i>0 is no longer satisfied, in Step S119, the edge validity determination unit 121 exits the loop.

Thus, in the loop from Step S116 to Step S119, the edge validity determination unit 121 repeats the processing while i is larger than 0. As a result, the validity determination for all the edges is completed. In other words, in the validity determination, the edges 301, 302, 303, 305, and 306 are determined as being valid, and the edge 304 is determined as being invalid.

Thus, the edge evaluation unit 12 is configured to determine the validity of all edges by determining, for each edge detected by the edge detection unit 11, a relationship between two edges by comparing a distance between the two edges and the bit period. As a result, erroneously detected edges can be removed, which enables highly accurate and robust position detection to be carried out.

<Near Edge Reevaluation Unit 122>

The near edge reevaluation unit 122 is configured to reevaluate the validity determined by the edge validity determination unit 121 for two adjacent edges having an interedge distance that is smaller than a first distance setting value set in advance.

Figure 7:
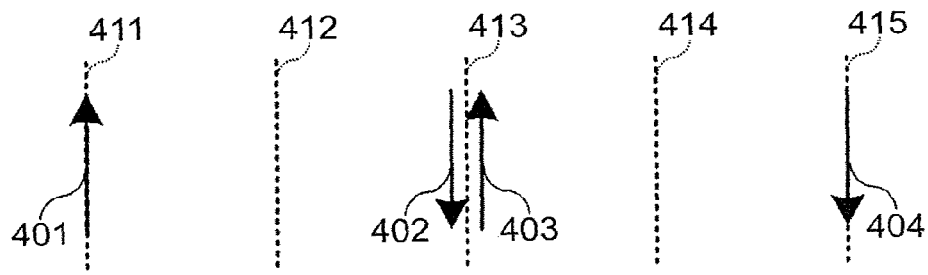
FIG. 7 is an explanatory diagram for showing a processing sequence by a near edge reevaluation unit according to the first embodiment of the present invention.

The processing performed by the near edge reevaluation unit 122 is now described with reference to FIG. 7. FIG. 7 is an explanatory diagram for showing a processing sequence by the near edge reevaluation unit 122 according to the first embodiment of the present invention.

In FIG. 7, an example of a positional relationship between edges 401 to 404 and bit period positions 411 to 415 is shown. The edges 401 and 403 are leading edges, and the edges 402 and 404 are trailing edges.

As shown in FIG. 7, the edge 401 is positioned on the bit period position 411, and the edge 404 is positioned on the bit period position 415.

The edge 402 and the edge 403 are both positioned close to each other near the bit period position 413. In this case, there is a high probability that the edge validity determination unit 121 determines that both the edge 402 and the edge 403 are valid. However, when edges are correctly detected, it is impossible for two edges to be so close to each other like the edge 402 and the edge 403. Thus, it can be said that any one of the two edges that are close to each other has been erroneously detected due to the affect of foreign matter or noise.

Therefore, the near edge reevaluation unit 122 is configured to reevaluate two edges that are close to each other, and determine one edge to be valid and another edge to be invalid.

Specifically, the near edge reevaluation unit 122 calculates the distance Extra to nearby edges for each edge that is close to another edge, and determines that the edge having the smaller sum of each calculated distance Extra to be valid, and the edge having the larger sum to be invalid.

For example, for both the edge 402 and the edge 403 that are close to each other, the near edge reevaluation unit 122 calculates the distance Extra to the edge 401 and the distance Extra to the edge 404. In other words, based on Expression (2), the near edge reevaluation unit 122 calculates and compares the sum of the distance Extra between the edge 401 and the edge 402 and the distance Extra between the edge 402 and the edge 404 with the sum of the distance Extra between the edge 401 and the edge 403 and the distance Extra between the edge 403 and the edge 404. The near edge reevaluation unit 122 then determines the edge having the smaller sum of the two calculated sums to be valid, and the edge having the larger sum to be invalid.

Note that, although an exemplary case is described here in which the evaluation is carried out using an edge positioned adjacent to two edges that are close to each other, the present invention may also be applied even if other edges are used. Further, although here the near edge reevaluation unit 122 is configured to operate after operation of the edge validity determination unit 121, the present invention can also be applied by operating the near edge reevaluation unit 122 before operation of the edge validity determination unit 121.

Thus, the edge evaluation unit 12 is configured to determine, based on a distance from each of two adjacent edges having an interedge distance that is smaller than the first distance setting value set in advance to an edge near the two adjacent edges, one of the two adjacent edges to be valid and the another edge to be invalid. As a result, an appropriate validity determination can be carried out for edges that are close to each other, which enables highly accurate and robust position detection to be carried out.

<Low-Reliability Edge Reevaluation Unit 123>

The low-reliability edge reevaluation unit 123 is configured to determine that an edge having a number of connections to other edges equal to or less than a connection setting value set in advance is invalid.

For example, when the variable setting value C is 3, the maximum number of other edges that one edge can be connected to is 3. The number of other edges that one edge can be connected to is referred to as a "connection number". As shown in FIG. 6 as an example, in the edge determination matrix, each of the elements at row 2, column 5, row 3, column 5, and row 4, column 5 are positive integers. This indicates that the edge 305 is connected to each of the edge 303, the edge 302, and the edge 301, respectively. On the other hand, because the edge 304 is not connected to any other edges, the edge validity determination unit 121 determines that the edge 304 is invalid.

However, in FIG. 6, for example, when the edge 303 is shifted toward the edge 302 side from the position shown in FIG. 6, the edge 304 and the edge 303 may be connected. In this case, the edge 304 has a connection number of 1 due to its single connection to the edge 303, and hence the edge validity determination unit 121 determines that the edge 304 is valid.

However, the reason why the edge 304 and the edge 303 are connected is because the position of the edge 303 is shifted to the edge 302 side. The fact that the edge 304 and the edge 303 are connected does not mean that the edge 304 is at the correct position. Therefore, it is proper to determine that the edge 304 is invalid. Thus, when the connection setting value is 1, the low-reliability edge reevaluation unit 123 determines that an edge having such a small connection number is invalid.

Note that, when the connection setting value is a positive integer less than the variable setting value C, the present invention can be applied even when the connection setting value is a value other than 1. Further, the present invention can also be applied by operating the low-reliability edge reevaluation unit 123 before operation of the near edge reevaluation unit 122.

Thus, regarding the relationship between the two edges, the edge evaluation unit 12 is configured to determine, when one of the edges has a number of connections to other edges that is equal to or less than a connection setting value, that the one edge is invalid.

<Distant Edge Exclusion Unit 124>

The distant edge exclusion unit 124 is configured to determine that the two edges are invalid when the distance between two adjacent edges is more than a second distance setting value set in advance.

Note that, Manchester encoding may be employed for the pseudo-random code marked on the scale 2. By its very nature, Manchester encoding ensures that the same bit is repeated no more than three times. Therefore, when the code marked on the scale 2 is based on Manchester encoding, the distance between two adjacent edges should not be three times or more the bit period.

In other words, when the distance between two adjacent edges is three times or more the bit period, this means that those edges have been erroneously detected due to the affect of foreign matter or noise. Therefore, when the second distance setting value is set to three times or more the bit period, the distant edge exclusion unit 124 determines that the two edges having such an interedge distance of three times or more the bit period are invalid.

Note that, the present invention can be applied even if Manchester encoding is not used, and can be applied even if the second distance setting value is, rather than set to three times the bit period, changed based on the code used for the scale 2. Further, the present invention can also be applied by operating the distant edge exclusion unit 124 before operation of any one of the edge validity determination unit 121, the near edge reevaluation unit 122, and the low-reliability edge reevaluation unit 123.

Thus, the edge evaluation unit 12 is configured to determine that both of the two adjacent edges are invalid when the distance between the two adjacent edges is more than a second distance setting value set so as to match a constant factor of the bit period based on a type of the code pattern marked on the scale 2. As a result, the validity determination of the edges can be carried out using the characteristics of the code, which enables highly accurate and robust position detection.

Note that, the present invention can be applied even when any one of the edge validity determination unit 121, the near edge reevaluation unit 122, the low-reliability edge reevaluation unit 123, and the distant edge exclusion unit 124 is not included in the edge evaluation unit 12.

[Details of the Code String Generation Unit 13]

Figure 8:
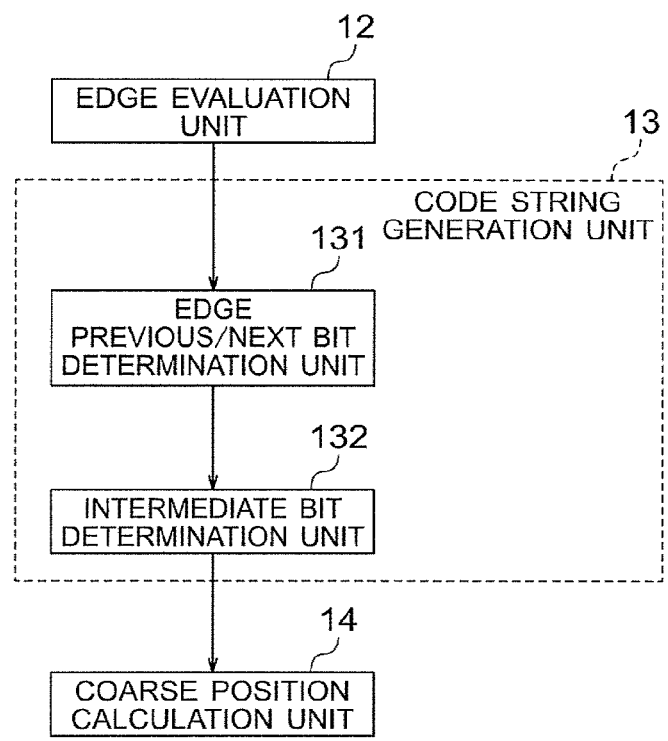
FIG. 8 is a block diagram for illustrating a configuration of a code string generation unit according to the first embodiment of the present invention.
Figure 9:
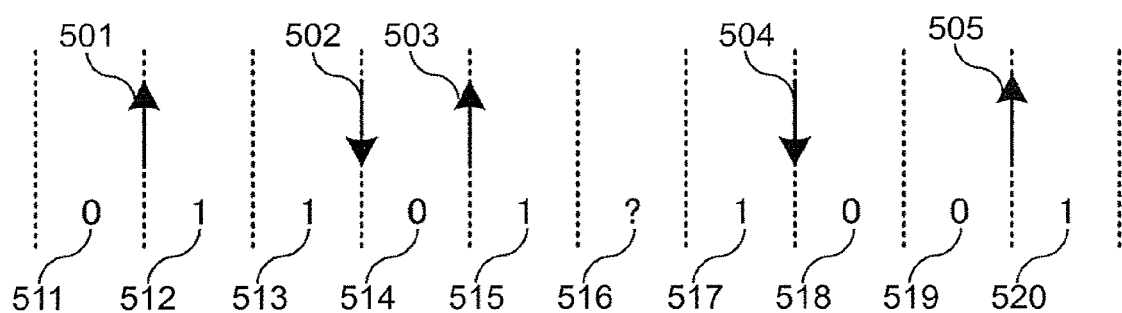
FIG. 9 is an explanatory diagram for showing a code string generation sequence by the code string generation unit according to the first embodiment of the present invention.

Next, the code string generation unit 13 is described in more detail with reference to FIG. 8 and FIG. 9. FIG. 8 is a block diagram for illustrating a configuration of the code string generation unit 13 according to the first embodiment of the present invention. FIG. 9 is an explanatory diagram for showing a code string generation sequence by the code string generation unit 13 according to the first embodiment of the present invention. Note that, in FIG. 9, a positional relationship between edges 501 to 505 and the bit period positions, and an example of bits 511 to 520 are shown.

The code string generation unit 13 is configured to generate the code string 24 based on the edge position data 23 including the positions to a sub-pixel resolution of the edges input from the edge evaluation unit 12 and the directions of the edges determined as being valid. The code string generation unit 13 is configured to uniquely determine the bits adjacent to the edges based on the directions of the edges determined as being valid, and determine how many bits the code between the edges are to be generated from based on the distance between two adjacent edges.

Further, as illustrated in FIG. 8, the code string generation unit 13 includes an edge previous/next bit determination unit 131 and an intermediate bit determination unit 132.

<Edge Previous/Next Bit Determination Unit 131>

As shown in FIG. 9, five edges, the edge 501 to the edge 505, are respectively positioned on a bit period position. Further, the edges 501, 503, and 505 are leading edges, and the edges 502 and 504 are trailing edges.

As described above with reference to FIG. 2, for a rising edge, because the value of the pixel immediately before the edge at which the signal waveform and the binarization processing threshold intersect is smaller than the value of the immediately following pixel, the bit on the left side of the edge can be said to be 0, and the bit on the right side of the edge can be said to be 1. Conversely, for a falling edge, the bit on the left side of the edge can be said to be 1, and the bit on the right side of the edge can be said to be 0.

Therefore, the edge previous/next bit determination unit 131 is configured to determine the value of the bits adjacent to an edge by checking the direction of the edge.

Specifically, as shown in FIG. 9, by checking the direction of the edge 501, the edge previous/next bit determination unit 131 can determine that the edge 501 is a rising edge. As a result, the edge previous/next bit determination unit 131 sets the bit 511 and the bit 512, which are adjacent to the edge 501, to 0 and 1, respectively. Similarly, the edge previous/next bit determination unit 131 sets the bit 513 and bit the 514, which are adjacent to the edge 502, to 1 and 0, respectively. The edge previous/next bit determination unit 131 also determines the values of the bit 515 and the bits 517 to 520, which are the bits other than the bits 511 to 514, based on the same procedure. Specifically, based on this procedure, each bit is determined as shown in FIG. 9.

However, as shown in FIG. 9, the interedge distance between the edge 503 and the edge 504 is three times the bit period. Three bits, namely, the bits 515 to 517, are between the edge 503 and the edge 504. The bit 515 is adjacent to the edge 503 and the bit 517 is adjacent to the edge 504, but the bit 516 is not adjacent to any edge. In such a case, the edge previous/next bit determination unit 131 does not determine a value for the bit 516.

<Intermediate Bit Determination Unit 132>

The intermediate bit determination unit 132 is configured to determine the value of the bits for which a value was not determined by the edge previous/next bit determination unit 131, namely, the value of the bits that are not adjacent to any edge. A bit that is not adjacent to any edge is referred to as an "intermediate bit".

The easiest method for the intermediate bit determination unit 132 to determine the value of an intermediate bit is for the intermediate bit determination unit 132 to uniformly determine the value of all intermediate bits to be 0 or 1.

On the other hand, the intermediate bit determination unit 132 may also be configured to determine the value of an intermediate bit based on the characteristics of the pseudo-random code marked on the scale 2. For example, the intermediate bit determination unit 132 can determine the value of an intermediate bit by focusing on the two edges to the left and the right that are nearest to the intermediate bit, and performing the determination based on a combination of the directions of the two adjacent edges.

As an example, the intermediate bit determination unit 132 is configured to determine the value of an intermediate bit based on the following method. Specifically, of the two edges to the left and the right that are nearest to the intermediate bits, when the edge to the left is a rising edge and the edge to the right is a falling edge, the intermediate bit determination unit 132 sets all of the intermediate bits to 0, and when the edge to the left is a falling edge and the edge to the right is a rising edge, the intermediate bit determination unit 132 sets all of the intermediate bits to 1.

Further, of the two edges to the left and the right that are nearest to the intermediate bits, when both the edges are leading edges, the intermediate bit determination unit 132 sets two bits from the left among the intermediate bits to 1 and the remaining bits to 0, and when both edges are trailing edges, sets two bits from the right among the intermediate bits to 1 and the remaining bits to 0.

Note that, the present invention can be applied even when elements for determining the intermediate bits include an element other than the edges to the left and right nearest to the intermediate bits.

Thus, for the edges determined as being valid, the code string generation unit 13 generates the code string by determining the number of bits and the bit values based on the direction of each edge and the distance between two adjacent edges. As a result, the code string can be generated based on the edges, which enables an accurate code string to be generated while suppressing the affect of foreign matter and noise.

Further, when there are intermediate bits that are not adjacent to any edge, the code string generation unit 13 is configured to, as a first operation, uniformly determine the value of the intermediate bits to be 0 or 1. In addition, when there are intermediate bits that are not adjacent to any edge, the code string generation unit 13 is configured to, as a second operation, determine the value of the intermediate bits based on a combination of the directions of the edges to the left and right of the intermediate bits. As a result, the value of the bits that are not adjacent to any edge can be optimally determined, which enables an accurate code string to be generated while suppressing the affect of foreign matter and noise.

[Details of the Coarse Position Calculation Unit 14]

Figure 10:
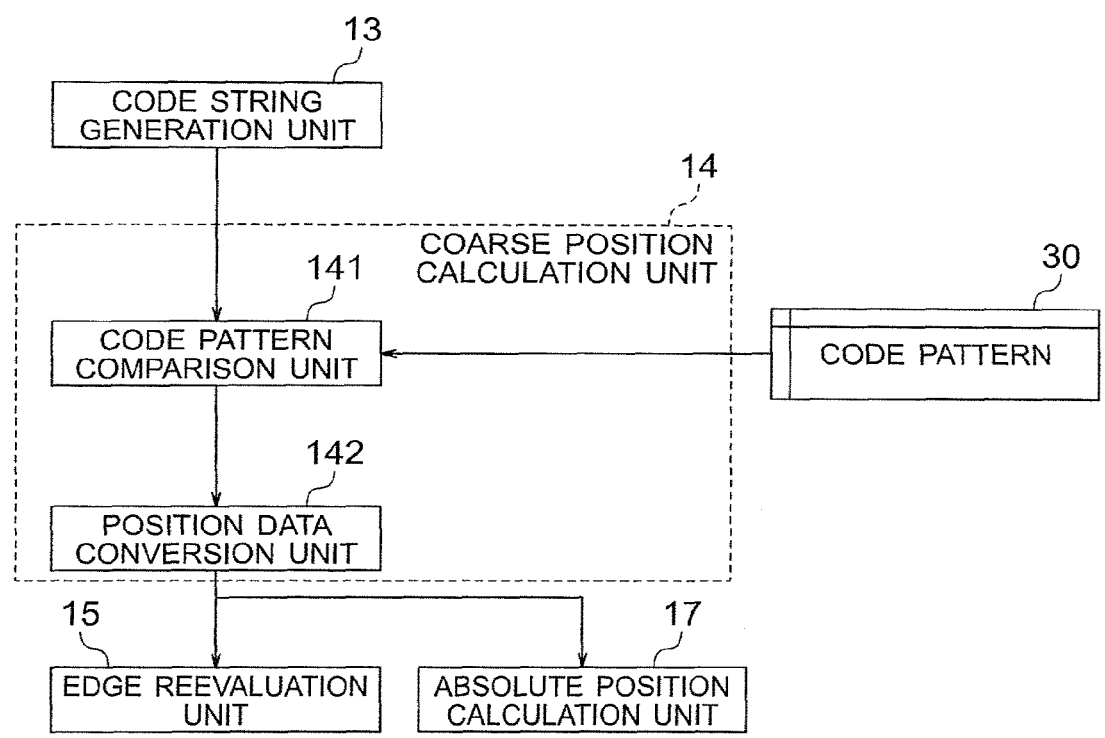
FIG. 10 is a block diagram for illustrating a configuration of a coarse position calculation unit according to the first embodiment of the present invention.

Next, the coarse position calculation unit 14 is described in more detail with reference to FIG. 10. FIG. 10 is a block diagram for illustrating a configuration of the coarse position calculation unit 14 according to the first embodiment of the present invention.

The coarse position calculation unit 14 is configured to calculate the coarse position data 25 using the code string 24 input from the code string generation unit 13 and a code pattern 30, which is data obtained by recording the code string of the pseudo-random code marked on the scale 2.

Further, as illustrated in FIG. 10, the coarse position calculation unit 14 includes a code pattern comparison unit 141 141 and a position data conversion unit 142.

<Code Pattern Comparison Unit 141>

The code pattern comparison unit 141 is configured to compare the code string 24 and the code pattern 30. The code pattern comparison unit 141 is configured to perform position detection in bit period units by calculating the positional relationship having the highest correlation between the code string 24 and the code pattern 30.

Specifically, the code pattern comparison unit 141 cuts the code length of the code string 24 from the code pattern 30, and calculates the Hamming distance between the code string 24 and the cut code string. In other words, based on Expression (3), the code pattern comparison unit 141 calculates the Hamming distance between the code string 24 and code strings cut from all positions of the code pattern 30 by shifting the cutting position by one bit each time, and performs position detection in bit period units based on the cutting position having the smallest Hamming distance. Note that, when there are a plurality of cutting positions having the smallest Hamming distance, the code pattern comparison unit 141 may select any one of those cutting positions from among the plurality of cutting positions, or may treat such a case as a position detection error.

$$coarsePos = \underset{i \in [1,N]}{\mathrm{argmin}} \left\{ \sum_{j=1}^{L} (sc[j] \oplus so[i+j]) \right\} \quad (3)$$

In Expression (3), coarsePos represents a comparison result, N represents the number of bits in the code marked on the scale 2, L represents a code length of the code string 24, sc[x] represents a value of an x-th bit of the code string 24, and so[x] represents a value of an x-th bit of the code pattern 30. Note that, when x is more than N, N is decreased by 1 and x is set as from 1 to N.

Note that, regarding the method of calculating the correlation between the code string 24 and the code pattern 30, the present invention can be applied even without using a calculation method that uses the Hamming distance.

<Position Data Conversion Unit 142>

The position data conversion unit 142 is configured to calculate the coarse position data 25 by converting the bit positions calculated by the code pattern comparison unit 141 into position data.

For example, for a rotary encoder, the output is required to be in the form of an angle, and not the bit position representing which bit of the pseudo-random code marked on the scale 2 is output by the code pattern comparison unit 141. The required output is referred to as a "required output format". The position data conversion unit 142 is configured to convert between the bit positions calculated by the code pattern comparison unit 141 and the required output format.

In the required output format, it is known how many units one bit of the pseudo-random code marked on the scale 2 corresponds to. Further, the origin is also known. Therefore, the position data conversion unit 142 is configured to convert the bit positions calculated by the code pattern comparison unit 141 into position data by multiplying a variable coefficient by the bit positions, and adding an offset calculated from the origin.

For example, for a rotary encoder, when one bit of the pseudo-random code marked on the scale 2 corresponds to 0.5 degrees, and the 0-th bit of the code is 30 degrees, when the code pattern comparison unit 141 output the 7-th bit as the bit position, the position data conversion unit 142 outputs 0.5×7+30=33.5 as the coarse position data 25.

Thus, the coarse position calculation unit 14 is configured to cut a code length of the code string from the code pattern 30, calculate the Hamming distance between the code string 24 and the cut code string, and calculate the coarse position data 25 based on the cutting position having the smallest Hamming distance among the cutting positions corresponding to the calculated Hamming distance. As a result, a correlation is calculated based on the Hamming distance, which enables highly accurate and robust position detection to be carried out while suppressing the calculation amount.

[Details of the Edge Reevaluation Unit 15]

Figure 11:
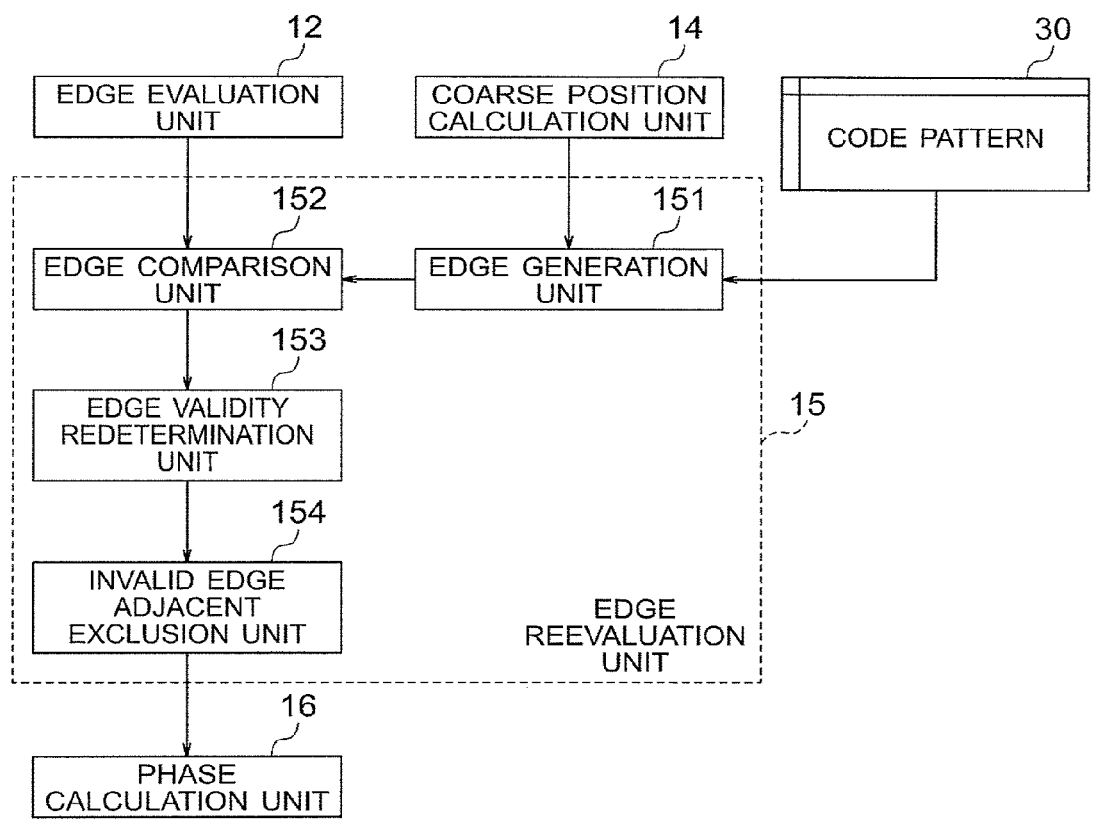
FIG. 11 is a block diagram for illustrating a configuration of an edge reevaluation unit according to the first embodiment of the present invention.

Next, the edge reevaluation unit 15 is described in more detail with reference to FIG. 11. FIG. 11 is a block diagram for illustrating a configuration of the edge reevaluation unit 15 according to the first embodiment of the present invention.

The edge reevaluation unit 15 is configured to reevaluate the validity of the edges using the coarse position data 25 input from the coarse position calculation unit 14 and the edge position data 23 input from the edge evaluation unit 12, and output the edge position data 26 including the reevaluation results.

Further, as illustrated in FIG. 11, the edge reevaluation unit 15 includes an edge generation unit 151, an edge comparison unit 152, an edge validity redetermination unit 153, and an invalid edge adjacent exclusion unit 154.

<Edge Generation Unit 151>

The edge generation unit 151 is configured to generate edge data based on the coarse position data 25. In other words, the edge generation unit 151 is configured to perform the reverse processing to that of the code string generation unit 13. However, regarding the code data that the processing is based on, the edge generation unit 151 uses a code string cut from the code pattern 30 based on the coarse position data 25 instead of the code string 24 generated by the code string generation unit 13.

Operation of the edge generation unit 151 is now described in more detail with reference to FIG. 9. In the example shown in FIG. 9, a case is considered where the bits 511 to 520 are respectively 0110111001. Note that, in FIG. 9, the bit 516 is considered to be 1.

In this case, the edge generation unit 151 is configured to generate leading edges as the edge data at the positions switching from 0 to 1. Specifically, the edge generation unit 151 generates the edge 501, the edge 503, and the edge 505, which are leading edges, as the edge data at a position between the bit 511 and the bit 512, a position between the bit 514 and the bit 515, and a position between the bit 519 and the bit 520, respectively.

Further, the edge generation unit 151 is configured to generate trailing edges as the edge data at the positions switching from 1 to 0. Specifically, the edge generation unit 151 generates the edge 502 and the edge 504, which are trailing edges, as the edge data at a position between the bit 513 and the bit 514 and a position between the bit 517 and the bit 518, respectively.

<Edge Comparison Unit 152>

The edge comparison unit 152 is configured to compare the edges generated by the edge generation unit 151 with the edge position data 23 input from the edge evaluation unit 12, and for those edges that do not match, update the validity determination in the edge position data 23 to invalid.

When an edge has been correctly detected by the edge detection unit 11, namely, is not error detection, the code string 24 that is generated based on the detected edge should match the code string cut from the code pattern 30 based on the coarse position data 25. Further, the edge generated by the edge generation unit 151 should also match the edge position data 23.

On the other hand, the reason why an edge generated by the edge generation unit 151 does not match the edge position data 23 is because of the error detection of the edge by the edge detection unit 11. Therefore, in such a case, the edge comparison unit 152 is configured to update the validity determination in the edge position data 23 to invalid.

Figure 12:
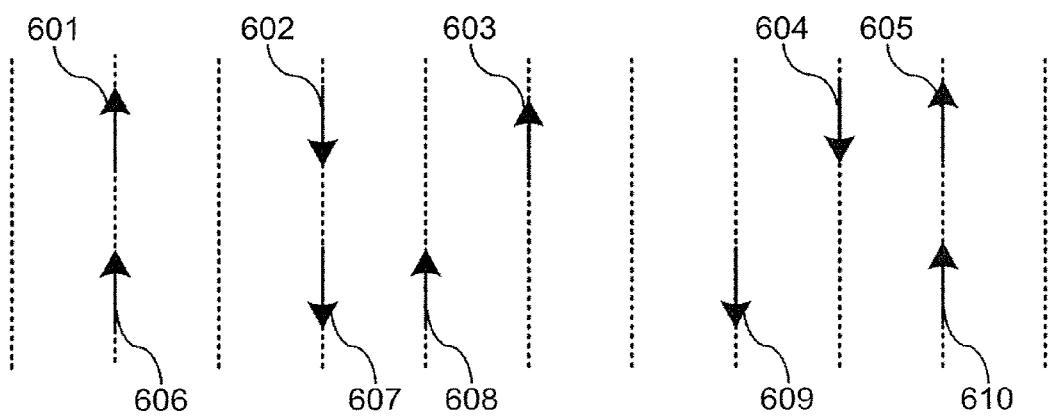
FIG. 12 is an explanatory diagram for showing a processing sequence by an edge comparison unit according to the first embodiment of the present invention.

Operation of the edge comparison unit 152 is now described in more detail with reference to FIG. 12. FIG. 12 is an explanatory diagram for showing a processing sequence by the edge comparison unit 152 according to the first embodiment of the present invention.

Note that, in FIG. 12, an example of a positional relationship among edges 601 to 605 generated by the edge generation unit 151, edges 606 to 610 included in the edge position data 23, and the bit period positions is shown. The edge 601 and the edge 606, the edge 603 and the edge 608, and the edge 605 and the edge 610, are leading edges. The edge 602 and the edge 607, and the edge 604 and the edge 609, are trailing edges.

As shown in FIG. 12, the positions and directions of the edge 601 and the edge 606 match each other. Similarly, the positions and the directions of the edge 602 and the edge 607 match the positions and the directions of the edge 605 and the edge 610. On the other hand, although the directions of the edge 603 and the edge 608 match the directions of the edge 604 and the edge 609, the positions of the edge 603 and the edge 608 do not match the positions of the edge 604 and the edge 609.

In such a case, the edge comparison unit 152 is configured to update the validity determination of the edge 608 and the edge 609 included in the edge position data 23 to invalid. Further, although not shown in FIG. 12, regarding the edges generated by the edge generation unit 151 and the edge position data 23, the edge comparison unit 152 is also configured to update the validity determination of the edges to invalid when the positions of the edges match but the directions are different.

Thus, the edge reevaluation unit 15 is configured to generate edges as coarse position edges based on the coarse position data 25 calculated by the coarse position calculation unit 14, compare the generated coarse position edges with the edges on which the validity determination has been performed by the edge evaluation unit 12, and when the coarse position edges and the edges do not match, update the validity determination of the edges to invalid. As a result, the validity of the edges is redetermined based on the coarse position calculation results provided as feedback by the coarse position calculation unit 14, which enables highly accurate and robust position detection to be carried out.

<Edge Validity Redetermination Unit 153>

The edge validity redetermination unit 153 is configured to calculate a deviation of each edge with respect to the bit period position, and update the validity determination of edges having a calculated deviation amount of more than a deviation setting value to invalid.

Figure 13:
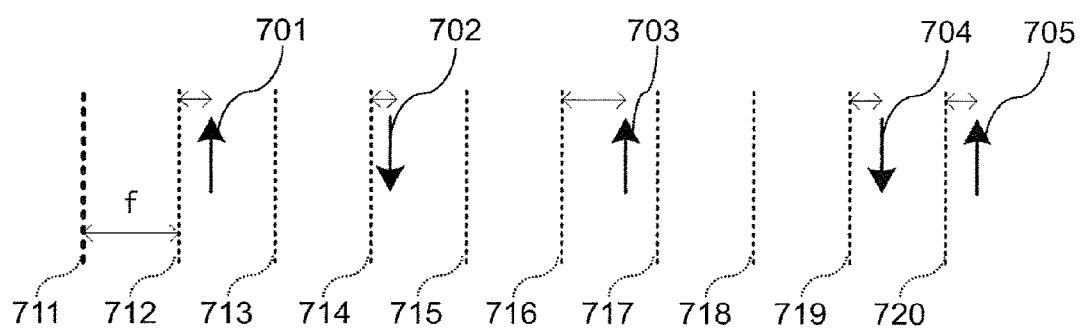
FIG. 13 is an explanatory diagram for showing a processing sequence by an edge validity redetermination unit according to the first embodiment of the present invention.
Figure 14:
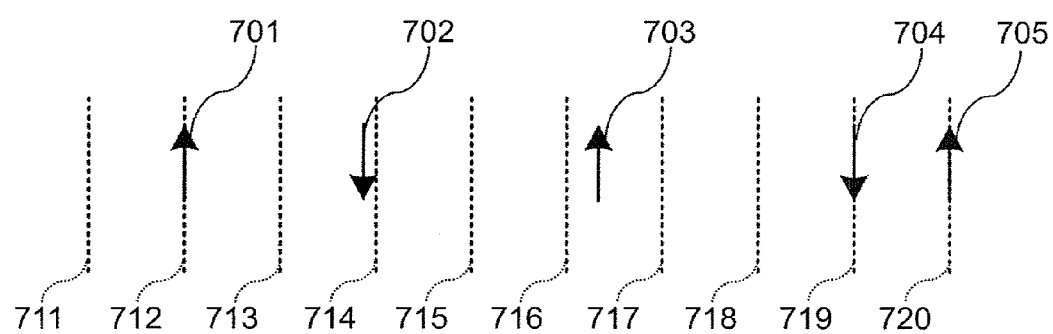
FIG. 14 is an explanatory diagram for showing a processing sequence by the edge validity redetermination unit according to the first embodiment of the present invention.

Operation of the edge validity redetermination comparison unit 153 is now further described with reference to FIG. 13 and FIG. 14. FIG. 13 and FIG. 14 are explanatory diagrams for showing a processing sequence by the edge validity redetermination unit 153 according to the first embodiment of the present invention.

Note that, in FIG. 13 and FIG. 14, an example of a positional relationship among edges 701 to 705 and bit period positions 711 to 720 is shown. The edge 701, the edge 703, and the edge 705 are leading edges. The edge 702 and the edge 704 are trailing edges.

Here, although the bit period is known, the bit position cannot be determined because the position to be used as a reference has not been determined. Therefore, as shown in FIG. 13, the edge validity redetermination unit 153 is configured to provisionally set the bit period position 711 at an arbitrary position. The edge validity redetermination unit 153 is configured to determine the bit period positions 712 to 720 at an interval of a known bit period f, based on the provisionally-set bit period position 711.

Further, the edge validity redetermination unit 153 is configured to, for each of the edges 701 to 705, determine the distance from each edge to the nearest bit period position from that edge. Specifically, for example, for the edge 702, the edge validity redetermination unit 153 determines the distance between the edge 702 and the bit period position 714, which is the bit period position nearest to the edge 702.

The edge validity redetermination unit 153 is configured to calculate the average of each of the determined distances between the bit period positions and the edges, and move each bit period position in parallel by the calculated average amount.

For example, from the positional relationship shown in FIG. 13, when the edge validity redetermination unit 153 calculates the average of each distance between the bit period positions and the edges, and moves each bit period position in parallel by the calculated average amount, the resultant positional relationship is as shown in FIG. 14. In other words, by moving the bit period position 712 in parallel from the positional relationship shown in FIG. 13, as shown in FIG. 14, the edge 701 and the bit period position 712 overlap, meaning that the positions of the edge 701 and the bit period position 712 match each other.

The edge validity redetermination unit 153 is configured to recalculate the distance between the bit period position and each edge based on the bit period position moved in parallel in this manner as being correct, and update the validity determination of edges having a calculated distance that is far away from the bit period position to invalid.

Specifically, as shown in FIG. 14, the edge validity redetermination unit 153 updates the validity determination of the edge 703, which is at a position far away from the bit period position, namely, which has a deviation amount with respect to the bit period position that is more than the deviation setting value, to invalid.

Note that, the present invention can also be applied by operating the edge validity redetermination unit 153 before operation of the edge comparison unit 152.

Thus, the edge reevaluation unit 15 is configured to calculate a deviation of each edge with respect to a bit period position, and update the validity determination of edges having a calculated deviation amount of more than the deviation setting value to invalid. As a result, the validity of the edges is redetermined based on a difference with a reference position, which enables highly accurate and robust position detection to be carried out while suppressing the calculation amount.

<Invalid Edge Adjacent Exclusion Unit 154>

The invalid edge adjacent exclusion unit 154 is configured to update, for the edge data including the updated results of the edge validity determinations by the edge comparison unit 152 and the edge validity redetermination unit 153, the edges determined as being valid that are adjacent to an edge determined as being invalid to invalid.

Note that, the present invention can also be applied by operating the invalid edge adjacent exclusion unit 154 before operation of any one of the edge comparison unit 152 and the edge validity redetermination unit 153. Further, the present invention can be applied even when any one of the edge comparison unit 152, the edge validity redetermination unit 153, and the invalid edge adjacent exclusion unit 154 is not included in the edge reevaluation unit 15.

Thus, the edge reevaluation unit 15 is configured to also update to invalid the validity determination of edges adjacent to an edge that has been updated to invalid. As a result, the edges near an edge determined as being invalid are also determined to be invalid, which enables highly accurate and robust position detection to be carried out.

[Details of the Phase Calculation Unit 16]

Next, the phase calculation unit 16 is described in more detail. The phase calculation unit 16 is configured to perform position detection at a resolution equal to or smaller than the bit period based on a relative position of the edges determined as being valid on the edge position data 26 input from the edge reevaluation unit 15. Specifically, the phase calculation unit 16 calculates a phase D as the phase data 27 based on Expression (4)

$$\begin{bmatrix} 1 & kvec(1) \\ \vdots & \vdots \\ 1 & kvec(c) \\ \vdots & \vdots \\ 1 & kvec(N) \end{bmatrix} \begin{bmatrix} D \\ F \end{bmatrix} = \begin{bmatrix} ZC(1) \\ \vdots \\ ZC(c) \\ \vdots \\ ZC(N) \end{bmatrix} \quad (4)$$

$$kvec(x) = \operatorname{int}\left(\frac{ZC(x) - ZC(c) + 0.5F}{F}\right)$$

In Expression (4), N represents the number of edges determined as being valid, $ZC(x)$ represents a position of an x-th edge determined as being valid, c represents an edge number nearest to the image center, F represents the bit period, D represents the phase, $\operatorname{int}(x)$ denotes the highest integer that is not more than x, and kvec is defined by the mathematical expression shown in Expression (4).

Figure 15:
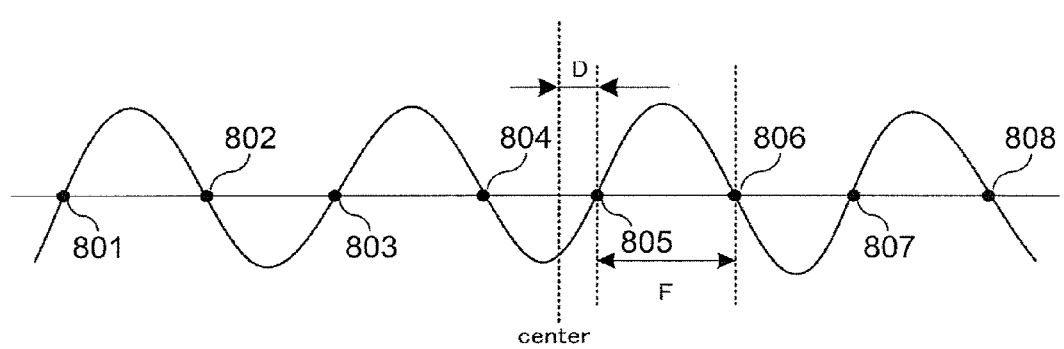
FIG. 15 is an explanatory diagram for showing a processing sequence by a phase calculation unit according to the first embodiment of the present invention.

Operation of the phase calculation unit 16 is now described in more detail with reference to FIG. 15. FIG. 15 is an explanatory diagram for showing a processing sequence by the phase calculation unit 16 according to the first embodiment of the present invention. In FIG. 15, an example in which edges 801 to 808 are arranged at intervals of a bit period F is shown.

As shown in FIG. 15, the edge nearest to an image center "center" is the edge 805, and the distance between the edge 805 and the image center "center" is a distance D. In other words, the kvec at the edge 805 is 0, the kvec at the edge 806 is 1, and the kvec at the edge 804 is −1.

In this case, the ZC for the edge 805 is D+0×F, and the ZC for the edge 804 is D+(−1)×F. Determining the ZC for all the edges gives Expression (4). Therefore, the phase can be determined by solving Expression (4) for D.

Note that, the present invention can be applied even when a weighting is applied to the calculation of Expression (4) for each edge. The weighting coefficient is calculated based on Expression (5) using the distance Extra between the bit period positions and each edge, for example.

$$weightCoff(x) = 1 - \frac{1 - MINWEIGHT}{Thre} \times Extra(x) \quad (5)$$

In Expression (5), weightCoeff(x) represents a weighting coefficient of the x-th edge, MINWEIGHT represents a lower limit value of the set weighting coefficient, Thre represents a setting threshold, and Extra(x) represents a distance between an x-th edge and the bit period position. Applying the weighting coefficient to Expression (4) gives Expression (6).

$$\begin{bmatrix} weightCoff(1) & weightCoff(1) \times kvec(1) \\ \vdots & \vdots \\ weightCoff(c) & weightCoff(c) \times kvec(c) \\ \vdots & \vdots \\ weightCoff(N) & weightCoff(N) \times kvec(N) \end{bmatrix} \quad (6)$$

$$\begin{bmatrix} D \\ F \end{bmatrix} = \begin{bmatrix} weightCoff(1) \times ZC(1) \\ \vdots \\ weightCoff(c) \times ZC(c) \\ \vdots \\ weightCoff(N) \times ZC(N) \end{bmatrix}$$

Thus, the phase calculation unit 16 is configured to calculate the phase D, which is the relative deviation of a bit period or less, as the phase data 27 based on the distance between the position of the edges determined as being valid and the bit period position, which is the reference position in bit period units generated based on the bit period, based on the validity determination results updated by the edge reevaluation unit 15.

[Details of the Absolute Position Calculation Unit 17]

Next, the absolute position calculation unit 17 is described in more detail. The absolute position calculation unit 17 is configured to calculate the absolute position 28 by adding the coarse position data 25 input from the coarse position calculation unit 14 and the phase data 27 input from the phase calculation unit 16.

Note that, for the signal processing circuit 10 according to the first embodiment, a case is described in which the signal processing circuit 10 includes both the edge evaluation unit 12 and the edge reevaluation unit 15. However, the same effect can also be obtained even when the signal processing circuit 10 includes, of the edge evaluation unit 12 and the edge reevaluation unit 15, only the edge evaluation unit 12. In this case, the phase calculation unit 16 is configured to calculate the phase data 27 using the validity determination results obtained by the edge evaluation unit 12 instead of using the validity determination results updated by the edge reevaluation unit 15.

The position detection device according to the first embodiment includes: an edge detection unit for detecting edges by binarizing an image signal converted by a light-receiving element; an edge evaluation unit for performing a validity determination based on a comparison between a bit period, which is a width corresponding to one bit of a code pattern marked on a scale, and a position of each of the edges detected by the edge detection unit; a code string generation unit for generating a code string from the edges determined as being valid based on results of the validity determination performed by the edge evaluation unit; a coarse position calculation unit for calculating a position in bit period units as coarse position data by comparing and performing a correlation calculation between the code string generated by the code string generation unit and the code pattern; a phase calculation unit for calculating, based on the results of the validity determination performed by the edge evaluation unit, a phase, which is a relative deviation of the bit period or less, as phase data based on a distance between the positions of the edges determined as being valid and a reference position in bit period units generated based on the bit period; and an absolute position calculation unit for calculating an absolute position by adding the coarse position data calculated by the coarse position calculation unit and the phase data calculated by the phase calculation unit.

As a result, the position detection device can be obtained that is capable of highly accurate and robust position detection by suppressing the affect of the error detection of an edge.

In addition, the position detection device according to the first embodiment may further include an edge reevaluation unit for updating the validity determination result of each of the edges on which the validity determination has been performed by the edge evaluation unit based on the coarse position data calculated by the coarse position calculation unit. In this configuration, the phase calculation unit is configured to calculate the phase data using the validity determination results updated by the edge reevaluation unit instead of the validity determination results obtained by the edge evaluation unit.

As a result, by including both the edge evaluation unit 12 and the edge reevaluation unit 15, the position detection device can be obtained that, compared with the configuration that only includes the edge evaluation unit 12, is even more capable of suppressing the affect of the error detection of an edge, and is hence capable of detecting even more accurate and more robust position.

Second Embodiment

In a second embodiment of the present invention, a position detection device is described that has the same configuration as the position detection device according to the first embodiment illustrated in FIG. 1 but differs from the position detection device according to the first embodiment in the configuration of the coarse position calculation unit 14 and the processing performed by each of the edge evaluation unit 12 and the edge validity redetermination unit 153.

Note that, in the second embodiment, a description of the matters that are the same as in the first embodiment is omitted. The second embodiment is described focusing on the differences in the configuration of the coarse position calculation unit 14, and the differences in the processing performed by each of the edge evaluation unit 12 and the edge validity redetermination unit 153.

Figure 16:
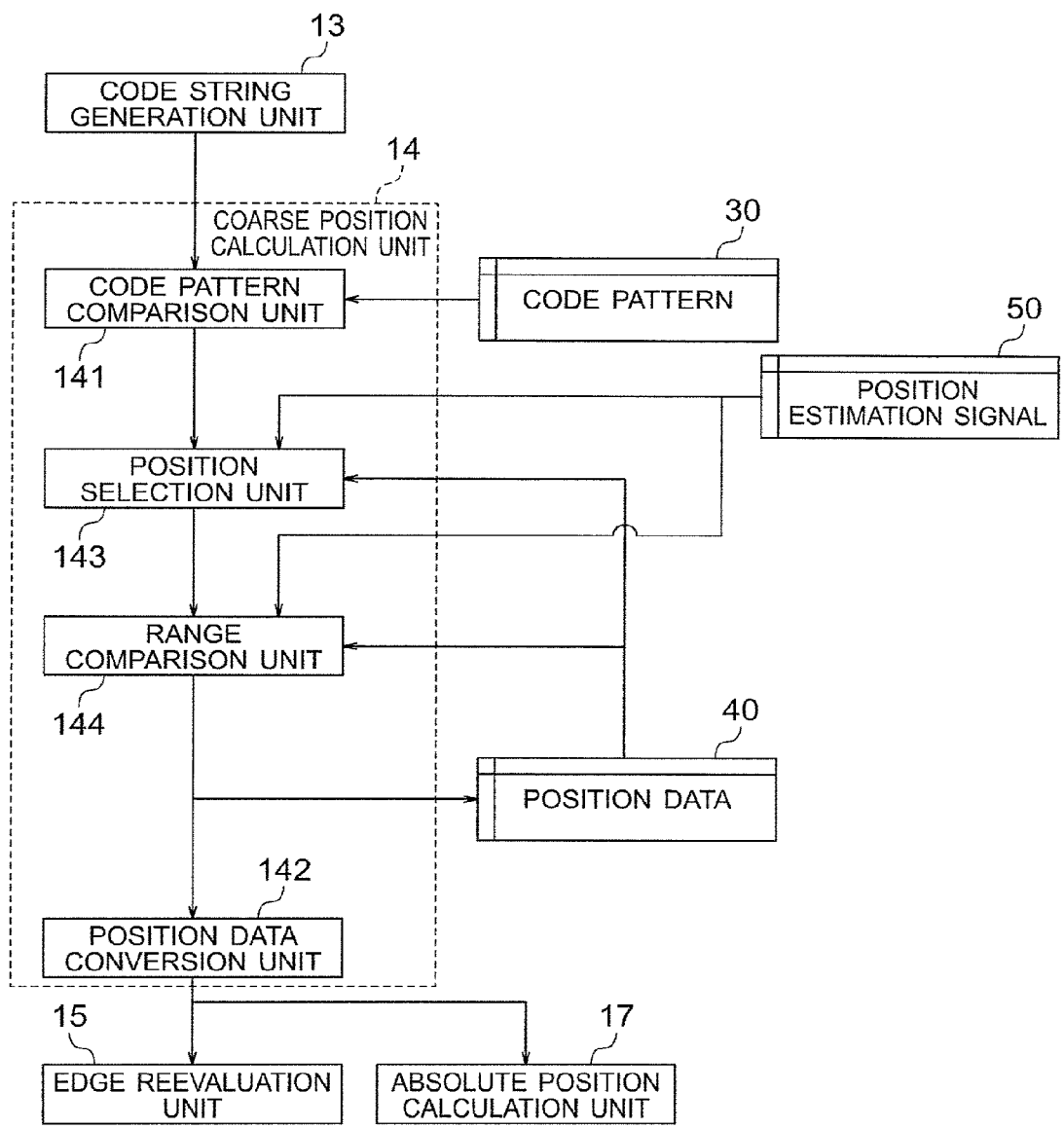
FIG. 16 is a block diagram for illustrating a configuration of a coarse position calculation unit in a position detection device according to a second embodiment of the present invention.

FIG. 16 is a block diagram for illustrating the configuration of the coarse position calculation unit 14 of the position detection device according to the second embodiment of the present invention.

[Details of the Coarse Position Calculation Unit 14]

The coarse position calculation unit 14 according to the second embodiment is configured to calculate the coarse position data 25 based on the code string 24 input from the code string generation unit 13. Further, as illustrated in FIG. 16, the coarse position calculation unit 14 includes a code pattern comparison unit 141, a position selection unit 143, a range comparison unit 144, and a position data conversion unit 142. The coarse position calculation unit 14 also includes a region for storing position data 40.

<Code Pattern Comparison Unit 141>

The code pattern comparison unit 141 performs the same processing on the code string 24 and the code pattern 30 as in the first embodiment. However, the number of comparison results that are output is different.

Specifically, the code pattern comparison unit 141 according to the first embodiment outputs one cutting position at which the Hamming distance is at a minimum as a comparison result. However, the code pattern comparison unit 141 according to the second embodiment is configured to output one or a plurality of comparison results. Note that, the present invention can be applied even if a set number of comparison results are output in increasing order of Hamming distance.

<Position Selection Unit 143>

The position selection unit 143 is configured to select one of the one or plurality of comparison results input from the code pattern comparison unit 141.

Specifically, when there is one input comparison result, the position selection unit 143 just outputs that single comparison result.

On the other hand, when there are a plurality of input comparison results, the position selection unit 143 reads the position data 40 indicating the position at a time prior to the current time input from the range comparison unit 144, and estimates the position at the current time using a position estimation signal 50, which is a signal regarding the acceleration or the like at the current time. Next, the position selection unit 143 outputs one comparison result indicating the nearest position to the estimated position at the current time based on the plurality of input comparison results.

Note that, the position estimation signal 50 is not limited to acceleration. The present invention can be applied using any kind of signal for the position estimation signal 50, as long as the position at the current time can be estimated in combination with the position data 40.

<Range Comparison Unit 144>

The range comparison unit 144 is configured to evaluate, using the position data 40 and the position estimation signal 50, the single comparison result output by the position selection unit 143.

Specifically, the range comparison unit 144 reads the position data 40, and estimates the position at the current time using the position estimation signal 50, which is a signal regarding acceleration or the like. Next, based on the estimated position at the current time, the range comparison unit 144 sets a range in which the distance from its center corresponding to the estimated position at the current time is equal to or less than a third distance setting value set in advance.

When the position indicated by the single comparison result output by the position selection unit 143 is within the set range, the range comparison unit 144 outputs the comparison result as is. On the other hand, when the position indicated by the single comparison result output by the position selection unit 143 is not within the set range, the range comparison unit 144 outputs a position detection error.

Note that, the present invention can be applied even when the coarse position calculation unit 14 does not include the range comparison unit 144.

<Position Data Conversion Unit 142>

The position data conversion unit 142 performs the same processing as in the first embodiment on the comparison results input from the range comparison unit 144.

Thus, the coarse position calculation unit 14 is configured to estimate a position at a current time based on the position data 40 indicating the position at a time prior to the current time, and the position estimation signal 50 of the current time, cut a code length of the code string 24 from the code pattern 30, calculate a Hamming distance between the code string 24 and the cut code string, and calculate the coarse position data 25 based on the cutting position nearest to the estimated position at the current time of the cutting position corresponding to the calculated Hamming distance. As a result, the processing is limited to a range centered on a predicted position, which enables position detection mistakes to be suppressed.

[Details of the Edge Evaluation Unit 12]

The edge evaluation unit 12 according to the second embodiment performs the validity determinations of the edges on the edge position data 22 input from the edge detection unit 11 by performing the same processing performed by the edge validity redetermination unit 153 of the edge reevaluation unit 15 in the first embodiment. Note that, the present invention can be applied even if the deviation setting value is different to that in the first embodiment.

Thus, the edge evaluation unit 12 is configured to calculate a deviation of each edge with respect to the bit period position, and determine that edges having a calculated deviation amount of more than a deviation setting value are invalid.

[Details of the Edge Reevaluation Unit 15]

Unlike the edge validity redetermination unit 153 in the first embodiment, the edge validity redetermination unit 153 of the edge reevaluation unit 15 in the second embodiment is configured to calculate an evaluation value based on the distance between an arbitrary edge and an edge adjacent to the arbitrary edge in the edge position data 23 input from the edge evaluation unit 12, and update the validity determination of the edge based on the calculated evaluation value.

Specifically, the edge validity redetermination unit 153 determines an evaluation value ReEvaluate (x) based on Expression (7) based on the distance from an arbitrary edge to edges determined as being valid that are to the left and right of the arbitrary edge.

$$ReEvaluate(x) = \left(1 - \frac{1 - MINW}{Thre} \times ExtraD(x, x-1)\right) \times \qquad (7)$$
$$\left(1 - \frac{1 - MINW}{Thre} \times ExtraD(x, x+1)\right)$$
$$ExtraD(x, y) = (ZC(y) - ZC(x)) - f \times int\left(\frac{ZC(y) - ZC(x)}{f}\right)$$

In Expression (7), ZC(x) represents a position of an x-th edge determined as being valid, f represents the bit period, MINW represents a setting lower limit value, Thre represents the setting threshold, and int(x) represents the highest integer that is not more than x.

Note that, when the edges adjacent to the arbitrary edge are determined as being invalid, the edge validity redetermination unit 153 is configured to calculate the evaluation value as described above by using the edges determined as being valid that are nearest to the arbitrary edge.

When the calculated evaluation value is more than the evaluation setting value set in advance, the edge validity redetermination unit 153 is configured to update the validity determination in the edge position data 23 to valid. When the calculated evaluation value is equal to or less than the evaluation setting value, the edge validity redetermination unit 153 is configured to update the validity determination in the edge position data 23 to invalid.

Note that, regarding the invention according to the second embodiment, it is not necessary for all of the edge evaluation unit 12, the coarse position calculation unit 14, and the edge validity redetermination unit 153 to be different from the first embodiment. The invention according to the second embodiment can be applied when one or more of these units are different.

Thus, the edge reevaluation unit 15 is configured to calculate, for an arbitrary edge, an evaluation value using a weighting coefficient based on an interedge distance between the arbitrary edge and edges determined as being valid that are adjacent to the arbitrary edge, and when the calculated evaluation value is equal to or less than an evaluation setting value, update the validity determination of the arbitrary edge to invalid. As a result, the edge validity is determined based on the weighting coefficient, which enables highly accurate and robust position detection to be carried out.

Thus, according to the second embodiment, the configuration of the coarse position calculation unit 14 and the content of the processing by each of the edge evaluation unit 12 and the edge validity redetermination unit 153 are different from in the first embodiment. As a result, the same effect as in the first embodiment can be obtained.

What is claimed is:

1. A position detection device for detecting an absolute position based on an image signal converted by a light-receiving element for receiving light irradiated from a light source toward a scale having a code pattern, the position detection device comprising:
    an edge detection unit for detecting edges by binarizing the image signal converted by the light-receiving element;
    an edge evaluation unit for performing a validity determination based on a comparison between a bit period, which is a width corresponding to one bit of the code pattern marked on the scale, and a position of each of the edges detected by the edge detection unit;
    a code string generation unit for generating a code string from the edges determined as being valid based on results of the validity determination performed by the edge evaluation unit;
    a coarse position calculation unit for calculating a position in bit period units as coarse position data by comparing and performing a correlation calculation between the code string generated by the code string generation unit and the code pattern;
    a phase calculation unit for calculating, based on the results of the validity determination performed by the edge evaluation unit, a phase, which is a relative deviation of the bit period or less, as phase data based on a distance between the positions of the edges determined as being valid and a bit period position, which is a reference position in bit period units generated based on the bit period; and
    an absolute position calculation unit for calculating the absolute position by adding the coarse position data calculated by the coarse position calculation unit and the phase data calculated by the phase calculation unit.

2. A position detection device according to claim 1, wherein the edge evaluation unit determines a combination of validity determinations of each of the edges that gives a maximum number of edges determined as being valid based on the bit period and a difference between arbitrary two edges of the edges detected by the edge detection unit.

3. A position detection device according to claim 1, wherein the edge evaluation unit determines the validity of all the edges by determining, for each of the edges detected by the edge detection unit, a relationship between two edges by comparing a distance between the two edges and the bit period.

4. A position detection device according to claim 3, wherein when determining the relationship between the two edges, the edge evaluation unit determines, when one of the edges has a number of connections to other edges that is equal to or less than a connection setting value, that the one of the edges is invalid.

5. A position detection device according to claim 1, wherein the edge evaluation unit determines, based on a distance from each of two adjacent edges having an interedge distance that is smaller than a first distance setting value to an edge near the two adjacent edges, one of the two adjacent edges to be valid and another of the two adjacent edges to be invalid.

6. A position detection device according to claim 1, wherein the edge evaluation unit determines that both of two adjacent edges are invalid when a distance between two adjacent edges is more than a second distance setting value set so as to match a constant factor of the bit period based on a type of the code pattern.

7. A position detection device according to claim 1, wherein the edge evaluation unit calculates a deviation of each of the edges with respect to the bit period position, and determines that an edge having a calculated deviation amount of more than a deviation setting value is invalid.

8. A position detection device according to claim 1, further comprising an edge reevaluation unit for updating a validity determination result of each of the edges on which the validity determination has been performed by the edge evaluation unit based on the coarse position data calculated by the coarse position calculation unit,
    wherein the phase calculation unit calculates the phase data using the validity determination results updated by the edge reevaluation unit instead of the validity determination results obtained by the edge evaluation unit.

9. A position detection device according to claim 8, wherein the edge reevaluation unit generates edges as coarse position edges based on the coarse position data calculated by the coarse position calculation unit, compares the generated coarse position edges with the edges on which the validity determination has been performed by the edge evaluation unit, and when the coarse position edges and the edges do not match, updates the validity determination of the edges to invalid.

10. A position detection device according to claim 8, wherein the edge reevaluation unit calculates a deviation of each of the edges with respect to the bit period position, which is a position of the bit period, and updates the validity determination of an edge having a calculated deviation amount of more than a deviation setting value to invalid.

11. A position detection device according to claim 9, wherein the edge reevaluation unit also updates to invalid the validity determination of an edge adjacent to an edge that has been updated to invalid.

12. A position detection device according to claim 8, wherein the edge reevaluation unit calculates, for an arbitrary edge, an evaluation value using a weighting coefficient based on an interedge distance between the arbitrary edge and edges determined as being valid that are adjacent to the arbitrary edge, and when the calculated evaluation value is equal to or less than an evaluation setting value, updates the validity determination of the arbitrary edge to invalid.

13. A position detection device according to claim 1, wherein the code string generation unit generates the code string by determining bits based on a direction of each of the edges and a distance between two adjacent edges.

14. A position detection device according to claim 13, wherein when there is an intermediate bit that is not adjacent to any edge, the code string generation unit uniformly determines a value of the intermediate bit to be one of 0 and 1.

15. A position detection device according to claim 13, wherein when there is an intermediate bit that is not adjacent to any edge, the code string generation unit determines a value of the intermediate bit based on a combination of the directions of the edges to left and right of the intermediate bit.

16. A position detection device according to claim 1, wherein the coarse position calculation unit cuts a code length of the code string from the code pattern, calculates a Hamming distance between the code string and the cut code string, and calculates the coarse position data based on a cutting position having the smallest Hamming distance among the cutting positions corresponding to the calculated Hamming distance.

17. A position detection device according to claim 1, wherein the coarse position calculation unit is configured to:
   estimate a position at a current time based on position data indicating the position at a time prior to the current time and a position estimation signal of the current time; and
   cut a code length of the code string from the code pattern, calculate a Hamming distance between the code string and the cut code string, and calculate the coarse position data based on a cutting position nearest to the estimated position at the current time among the cutting positions corresponding to the calculated Hamming distance.

* * * * *